United States Patent [19]

Upchurch, Jr.

[11] 4,155,225

[45] May 22, 1979

[54] AIR CONDITIONER CONTROL MEANS

[76] Inventor: Thomas B. Upchurch, Jr., 101 Magnolia St., Raeford, N.C. 28376

[21] Appl. No.: 836,020

[22] Filed: Sep. 23, 1977

[51] Int. Cl.² .................. F02B 77/08; F25B 27/00; B60J 25/00
[52] U.S. Cl. ............................ 62/133; 62/323; 180/104; 123/198 R; 307/10 R
[58] Field of Search .............. 62/323, 228, 133; 123/198 R; 180/104, 100, 53; 307/10 R; 200/52 A

[56] References Cited

U.S. PATENT DOCUMENTS

| 3,121,314 | 2/1964 | Koyanagi | 62/133 |
| 3,229,109 | 1/1966 | Wilson | 307/10 R |
| 3,462,964 | 8/1969 | Haroldson | 62/133 |

*Primary Examiner*—William E. Wayner
*Attorney, Agent, or Firm*—Mills & Coats

[57] ABSTRACT

In abstract, a preferred embodiment of this invention is a control means for vehicular type air conditioning systems wherein when a vehicle reaches a certain incline a preset switch will open thereby shutting off the air conditioning system of the vehicle until a more level inclination is reached. Additionally, a manual bypass is provided as is a level adjustment for the switch.

8 Claims, 4 Drawing Figures

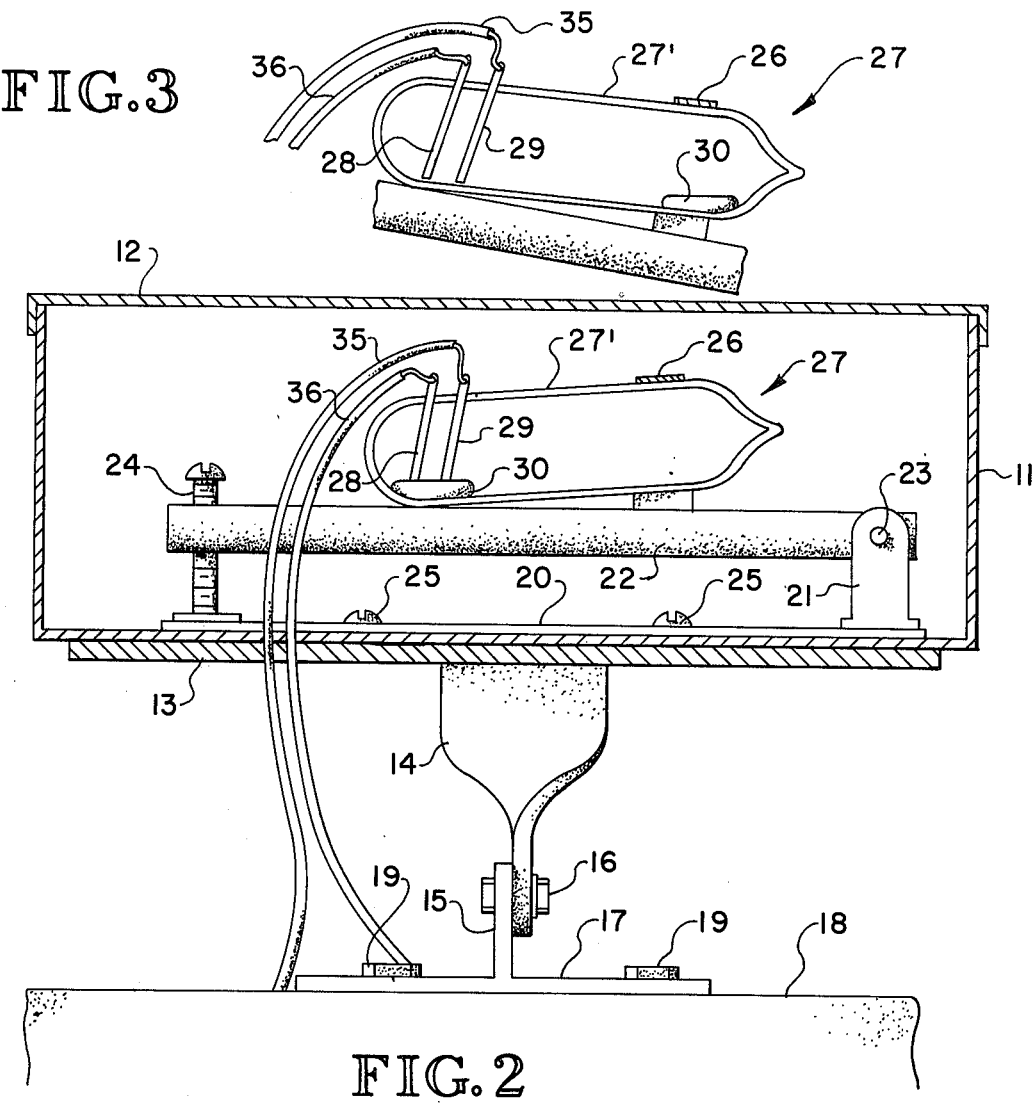
FIG. 3
FIG. 2
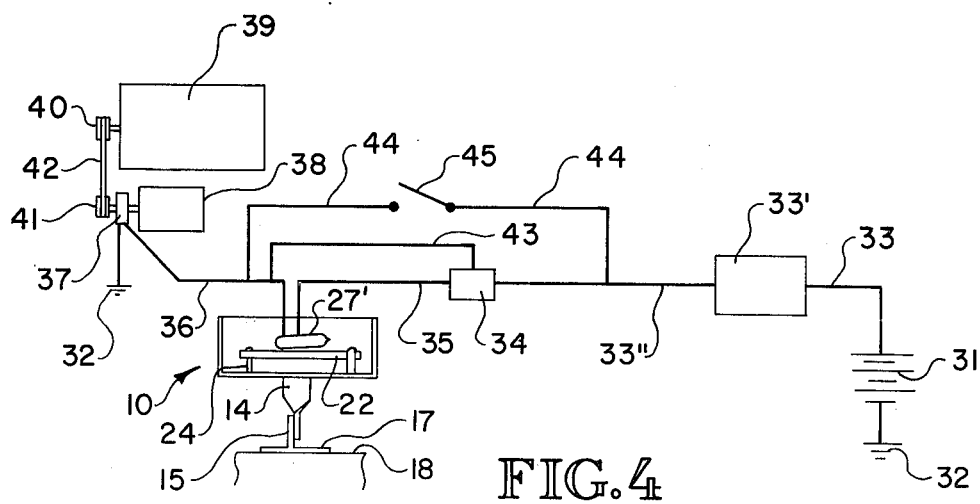
FIG. 4

AIR CONDITIONER CONTROL MEANS

BACKGROUND OF THE INVENTION

This invention relates to mobile air conditioning systems and more particularly to means for automatically controlling the air conditioning system of a vehicle for more economic operation.

Since the advent of vehicular air conditioning systems by far the majority have had compressors run directly off the engine, usually by a pulley and belt arrangement. Because the refrigerant compressors of air conditioning systems require a relatively large amount of power to properly function, propel power of the engine, particularly in automotive type applications, is reduced with a proportional increase in fuel consumption. In hard pulling situations such as traversing long, relatively steep grades, the added load of an air conditioning system can cause engine overheating and even dropping back to a lower gear.

Likewise, even on slight inclines greater additional loads are placed on the engine to move the thousands of pounds of vehicle weight up the same. At this point continued use of the air conditioning system requires greater fuel consumption than level or down hill conditions. Also, the majority of driving, except in mountainous areas, is up and down without extremely long grade climbs being necessary.

To overcome the problems enumerated above, various systems have been devised including manifold pressure control air conditioner power switches, complicated electronic speed detection and temperature sensing systems, as well as centrifugal switch controls. All of these systems, however, are either difficult to install, complex to maintain or are inadequate for the purposes intended.

SUMMARY OF THE INVENTION

After much research and study into the above mentioned problems, the present invention has been developed to provide a vehicular air conditioning control system wherein whenever the vehicle becomes disposed at a certain predetermined incline, the air conditioning control system will automatically become disengaged thus relieving the air conditioning compressor load on the vehicle engine. Once a predetermined basically level or down hill disposition is achieved, the control switch will close again engaging the cooling system.

In view of the above, it is an object of the present invention to provide vehicle air conditioning control switch means for automatically preventing operation of the same under adverse conditions.

Another object of the present invention is to provide, in a vehicle type air conditioning system, a means to prevent excessive fuel consumption due to operation of such system.

Another object of the present invention is to provide, in a vehicle type air conditioning system, a means for sensing vehicular inclination and for shutting down such system upon a predetermined inclined angle being reached.

Another object of the present invention is to provide, in a vehicle type air conditioning system, a means for shutting down such system under certain adverse conditions and a means for bypassing said automatic system.

Another object of the present invention is to provide a simple, inexpensive and yet highly efficient means for reducing the fuel consumption required to air condition a vehicle.

Another object of the present invention is to provide a vehicular sensing means for use in conjunction with a vehicle air conditioning system which is simple to install and yet highly efficient in operation.

Other objects and advantages of the present invention will become apparent and obvious from a study of the following description and the accompanying drawings which are merely illustrative of such invention.

BRIEF DESCRIPTION OF DRAWINGS

FIG. 2 is a sectional view taken through lines 2—2 of FIG. 1;

FIG. 3 is a fragmentary view of the switch portion of the present invention in open position; and FIG. 4 is a schematic of the control means of the present invention.

DETAILED DESCRIPTION OF PREFERRED EMBODIMENT

Figure 1:
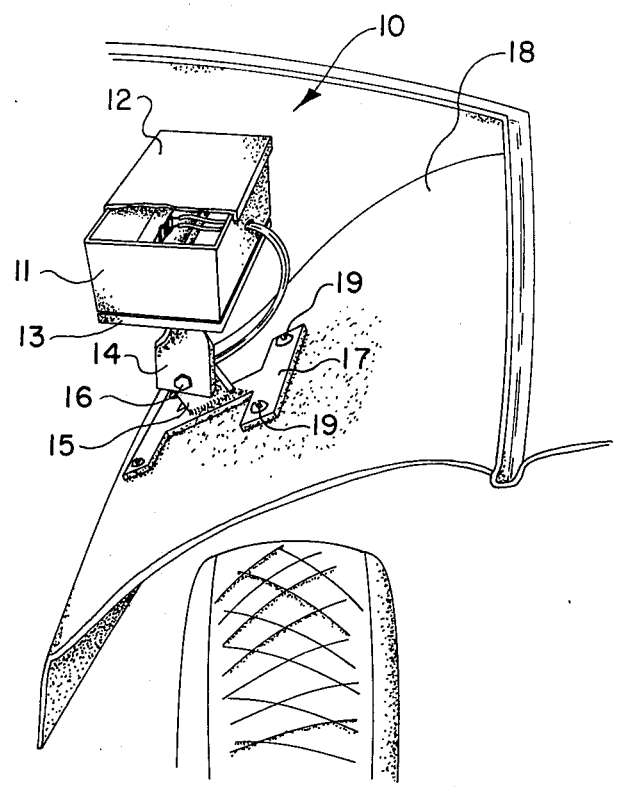
FIG. 1 is a perspective view of the air conditioner control means of the present invention operatively mounted on a vehicle.

With further reference to the drawings, the air conditioner control means of the present invention, indicated generally at 10, includes a generally rectangular box-like housing 11. A top closure 12 is adapted to releasably fit over the open portion of housing 11 as can be seen clearly in FIG. 1.

A housing support frame 13 is provided. Support pivot member 14 is secured at one end to the central portion of support frame 13 as seen clearly in FIG. 2. The other end of support member 14 is disposed juxtaposed to base support flange 15 and is held in relatively fixed but pivotable relationship therewith by means such as bolt 16. The end of support flange 15 opposite its connection with support member 14 is fixedly secured to base support member 17 which is preferably H shaped in configuration as can be seen clearly in FIG. 1.

The H shaped configuration of base member 17 allows for more or less universal mounting of the control means 10 of the present invention on vehicles such as that indicated at 18. The particular configuration illustrated is a typical vehicle engine compartment wheel well with support member 17 attached thereto by means such as metal screws 19.

Again, the configuration of base support member 17 allows it to fit the varying configurations of different vehicle wheel wells as well as allowing the control means to be mounted in other locations, either in the engine compartment or other on portions of the vehicle.

Interiorly mounted within housing 13 is a control switch mechanism arm or bar 22. One end of the support arm is pivotably mounted to the upper portion of upright member 21 by means such as pivot pin 23 as seen clearly in FIG. 2. The other end of support arm 22 is adapted to threadingly receive adjusting screw 24. Again from FIG. 2 it can be seen that as adjusting screw 24 is turned in one direction that end of support bar 22 will raise while when said screw is turned in the other direction the end of support bar 22 will lower.

Means such as screws 25 are used to secure the base 20, housing 11 and housing support frame 13 in relative fixed relationship to each other.

A strap or band 26 secures mercury switch bulb 27' to support bar 22. Contacts 28 and 29 are provided within bulb 27' as is mercury 30. Thus it can be seen that when the control means 10 of the present invention is in the position shown in FIG. 2, electrical contact is made through mercury 30 between electrodes 28 and 29 while when in the position shown in FIG. 3, the circuit between said electrodes is open.

Referring specifically to the schematic of FIG. 4, a source of electrical power such as battery 31 is connected at one side to ground 32 and the other side to line 33 which leads to the standard vehicle air conditioning control 33'. Line 33" then leads to delay switch 34. Line 35 connects switch 34 with electrode 29 of mercury switch 27. Line 36 leads from electrode 28 to electromechanical clutch 37 which is grounded at 37'. This clutch controls operation of the air conditioner compressor 38 which is driven by the vehicle engine 39 through pulleys 40 and 41 and belt 42, all in the standard manner well known to those skilled in the art.

Line 43 runs from delay switch 34 to line 36 thus bypassing switch 27. Also bypassing switch 27 is line 44 which is connected between lines 33 and 36 with manual bypass switch 45 operatively connected therein.

To connect the air conditioning control means of the present invention, the standard line leading from the standard air conditioning control 33' to the electromechanical clutch 37 of air conditioning compressor 38 has installed therein lines 33' and 36. The air conditioning control means 10 is then physically installed at a convenient location on the vehicle such as fender wall 18 and the system is ready for operation.

To operate the control means of the present invention, the standard vehicle air conditioning control 33' is turned on. If positive air conditioning operation is desired, manual bypass switch 45 (which can be conveniently located within the passenger compartment of the vehicle) is closed thus bypassing control 10. Once the vehicle is cooled down and economic operation is desired, manual bypass switch 45 is opened. If the inclination of the vehicle is such that mercury switch 27 is in the position shown in FIG. 2, current will pass along line 33" through delay switch 34 through switch 27 and to clutch 37 to energize the same.

Whenever inclination of the vehicle is such to cause the mercury 30 by gravity to move to the position shown in FIG. 3, or whenever vehicle acceleration causes the same, the circuit through switch 27 will be interrupted thus disengaging compressor 38. To prevent rapid off and on contact between electrodes 28 and 29 through mercury 30 when at the transition inclination or acceleration, delay bypass 34 is provided which keeps the circuit past switch 27 closed for a predetermined length of time after such switch opens.

If switch 27 is not operating at the proper inclination, a few turnings on adjusting screw 24 will raise or lower the inclination of support 22 relative to the vehicle on which it is mounted.

The standard vehicle air conditioner controls 33, of course, will automatically through its thermostat (not shown) from time to time interrupt the flow of current to clutch 37 and thus at such times the system of the present invention will be static. When current is again, through normal operation, allowed to flow through controls 33', the system of the present invention will economically control compressor 38.

From the above, it can be seen that the present invention has the advantage of providing an extremely simple to install air conditioner control means which operates to reduce fuel consumption and lessen the chances of over-heating by giving the engine of the vehicle more power at the times when the same is needed. The means of the present invention also has the advantage of providing a simple sensing type control means which is inexpensive to produce and maintain and yet is highly efficient in operation.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. In an engine powered vehicle, a means for regulating an engine driven, electrically controlled accessory comprising: an incline sensing means mounted on said vehicle and including a switch means which will open when a predetermined incline is reached and will close at a predetermined near level or down hill disposition is reached; and means for operatively connecting said sensing switch means into the electrical control circuit of said accessory whereby when said vehicle becomes disposed in a predetermined incline, said sensing switch means will shut off said accessory and when a predetermined near level or down hill disposition is reached, said switch will close thereby allowing said accessory to be driven.

2. The means of claim 1 wherein said sensing and switch means is a mercury switch.

3. The means of claim 1 wherein said accessory is an air conditioning system.

4. The means of claim 3 wherein said air conditioning accessory includes an electromagnetic clutch operated by said electrical control.

5. The means of claim 1 wherein said sensing switch means is adjustably mounted on said vehicle.

6. The means of claim 5 wherein said adjusting means is a screw threadingly mounted on one end of a pivotable arm carrying said sensing means.

7. The means of claim 1 wherein a delay switch is provided in said switch circuit whereby rapid opening and closing of said switch means will not adversely effect the operation of said accessory.

8. The means of claim 1 wherein a manually operated bypass switch is provided to override said sensing switch.

* * * * *